UNITED STATES PATENT OFFICE.

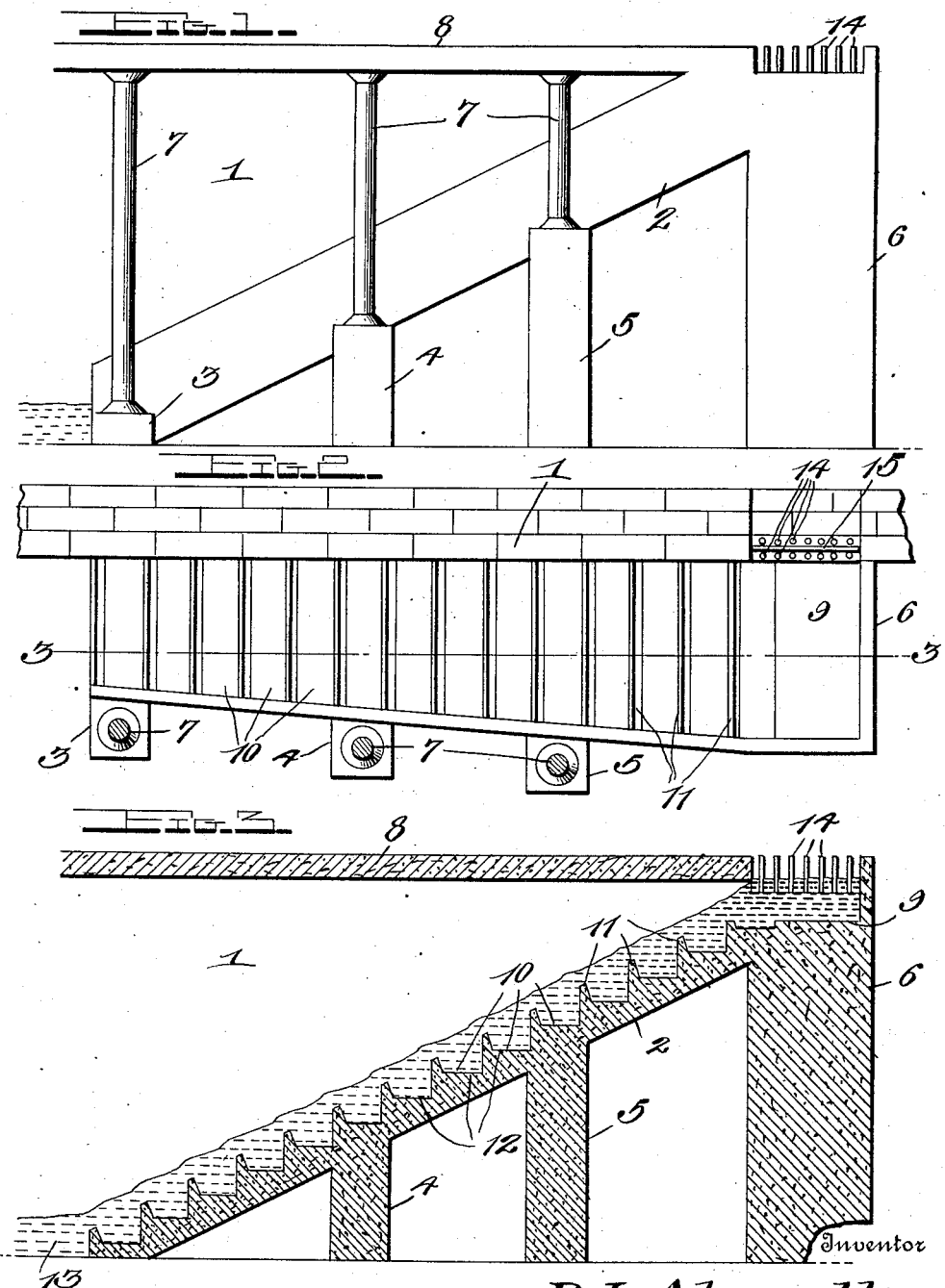

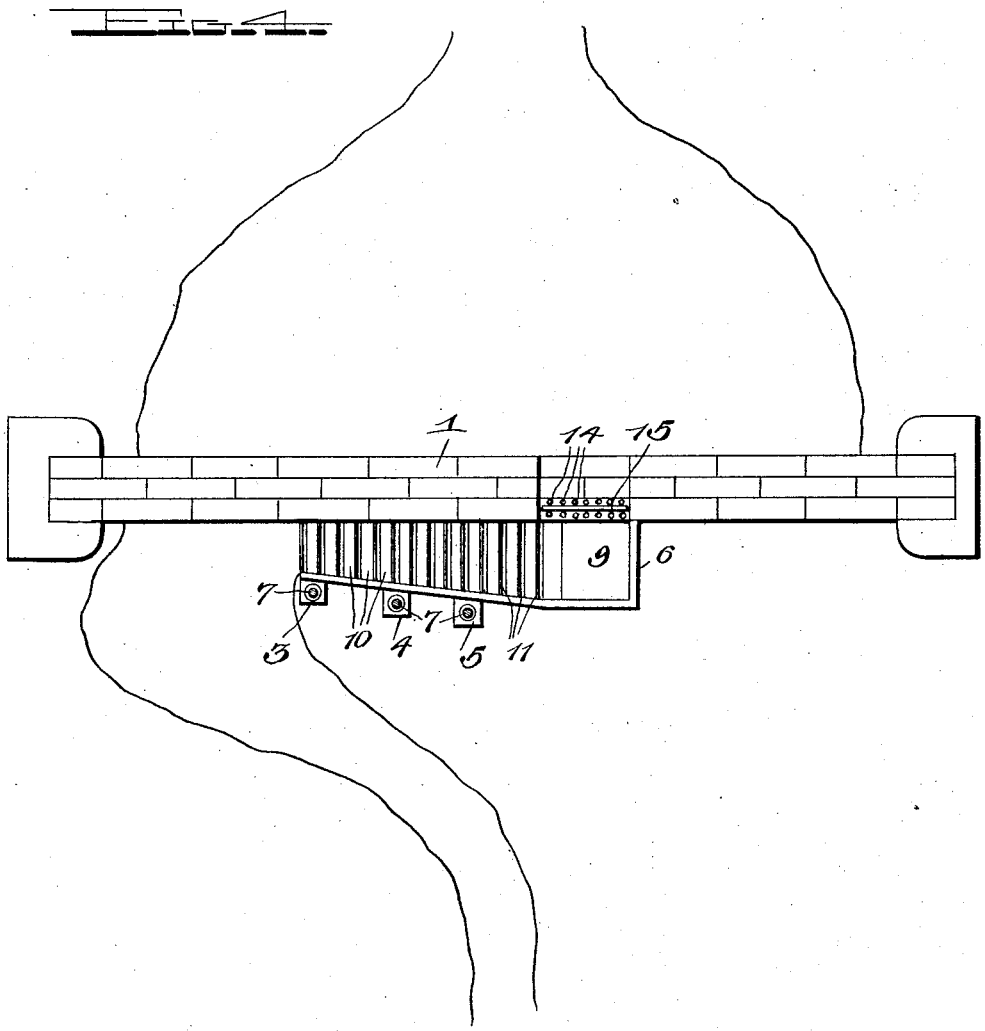

DANIL L. ABERNATHY, OF LOWELL, NORTH CAROLINA.

FISHWAY.

1,047,604.  Specification of Letters Patent.  Patented Dec. 17, 1912.

Application filed April 2, 1912. Serial No. 688,086.

*To all whom it may concern:*

Be it known that I, DANIL L. ABERNATHY, a citizen of the United States, residing at Lowell, in the county of Gaston and State of North Carolina, have invented certain new and useful Improvements in Fishways, of which the following is a specification, reference being had to the accompanying drawings.

This invention relates to fishways and has for its object the provision of a novel construction designed to permit fish to pass in the easiest manner up streams which are obstructed by dams and thus permit propagation and culture of this important source of food.

It is well known that in many parts of the country the industrial development and commercialization of streams has practically denuded many of them of fish and the comparatively vast sums of money spent by the Government in restocking these streams with fish is wholly inadequate to remedy the evil. By my invention the fish are enabled to ascend the rivers and streams without hindrance from dams constructed across the same, whereby the upper reaches are kept supplied.

In order to encourage the fish to ascend streams and particularly at the spawning season it is requisite that the way provided for them shall be such as to render the ascent possible by easy stages so that no jump will be required approaching the limit of the ability of the fish, and that the way shall be as nearly natural as is possible to attain, and the surrounding conditions such as will not excite the suspicions of the fish. Having these objects in view I provide a stone or concrete chute provided with steps or pockets over which the water flows adjacent the dam and covered in such a way as to render the same inviting.

The invention as hereinafter particularly claimed will be readily understood from the following detailed description taken in connection with the accompanying illustrative drawings, wherein—

Figure 1 is a front elevation of a portion of the dam showing the fishway; Fig. 2 is a top plan view with the roof removed, Fig. 3 is a section on the line 3—3 of Fig. 2 with a gate removed, and Fig. 4 is a plan view of the dam illustrating the same with relation to the bed of the stream and having the roof of the chute removed.

In the drawings the reference numeral 1 designates the lower face of a dam of masonry or any other suitable construction. Arranged against the same and transversely of the stream is a chute 2 advantageously made of concrete and supported by piers 3, 4, 5 and 6. Resting upon the piers at the side of the chute are pillars 7 which serve to support a roof 8 which may also be of concrete and flush with the crest of the dam. The upper end of the chute is stepped slightly below the level of the water in the dam to form above the pier 6 a pool 9 of substantially equal length and breadth. The upper face of the inclined portion of the chute is provided with a series of steps 10 having a rise equal to approximately fifty per cent. of the advance and provided along their lower edges with ribs 11 whereby pockets 12 are formed between said ribs and the front face of the next higher step. This series of steps extends from the lower level of the stream at 13 to the pool 9 from which the next adjacent step is separated by one of the ribs 11.

In practice I have found it advantageous, in connection with the dam of say thirty feet high to provide an opening from the water above the dam to the pool and from the pool to the uppermost step of approximately eight feet in width and to gradually narrow the chute from eight feet at the top to six feet at the bottom, dividing the incline of the chute into about fourteen steps having a rise of about two feet each and an advance of about four feet, the rib extending to a height of about two feet above the surface of the step proper and provided with an inwardly sloping edge so that the lower vertical wall of each pocket is approximately two feet high and the upper wall four feet high. The flow of water down the chute maintains a pool of water in each pocket at least two feet deep and approximately four feet wide which affords a resting place for the fish during the ascent and a convenient starting point for a leap through the water passing into the pocket from the pocket next above. After the structure has been in place a very short time the concrete becomes moss covered and the passage way which is provided for the fish closely simulates the natural conditions found in rapids and the like. The roof overhanging the chute shields the same from the glare of the sun and makes it more inviting while also in case of extraordinary floods it would protect the chute from the debris carried over the crest of the dam.

Means are provided for shutting off the chute when desired, said means consisting of a rack arranged between the pool and the water above the dam and consisting of rods 14 let into the masonry at spaced intervals of about one foot which serve the double purpose of a support for a gate 15 and also as a screen to prevent driftwood and the like from entering the pool and chute.

Having thus described my invention, I claim:

1. The combination, with a dam, of a stepped chute arranged transversely of the stream and inclined from top to bottom in one direction on the lower face of the dam, said chute tapering from the top toward the bottom thereof, a pool at the head of the chute communicating with the water above the dam and the chute, a roof lying flush with the crest of the dam, the said dam adapted to support one end of the said roof and pillars arranged along one side of the chute for supporting the opposite side of the roof substantially as described.

2. The combination with a dam, of a concrete fishway comprising a chute extending parallel with the said dam and adjacent thereto, the upper face of the inclined portion of the chute being provided with a series of steps, the upper face of the dam having a passage way formed therein, a pool formed in the end of the chute stepped slightly below the level of the water in the dam and communicating with said passage way, a plurality of piers for supporting the chute, one of said piers supporting the upper end of the chute and the other said pier supporting the lower end and the intermediate portion of the chute and being provided with laterally extending projections, pillars mounted upon said projections, a roof lying flush with the crest of the dam and completely covering the said chute, the said pillars adapted to support the said roof, a plurality of spaced rods mounted within the passage way of the pool and a gate supported between said rods substantially as and for the purpose set forth.

In testimony whereof I hereunto affix my signature in the presence of two witnesses.

DANIL L. ABERNATHY.

Witnesses:
JOHN W. GROVES,
ABRAM W. TITMAN.